Nov. 23, 1965   R. F. RASMUSSEN   3,219,296
MANUAL CONTROL APPARATUS FOR STEERABLE CRAFT
Filed Jan. 18, 1965   2 Sheets-Sheet 1

INVENTOR.
ROBERT F. RASMUSSEN
BY
ATTORNEY

Nov. 23, 1965     R. F. RASMUSSEN     3,219,296
MANUAL CONTROL APPARATUS FOR STEERABLE CRAFT
Filed Jan. 18, 1965     2 Sheets-Sheet 2

INVENTOR.
ROBERT F. RASMUSSEN
BY
ATTORNEY

United States Patent Office 3,219,296
Patented Nov. 23, 1965

3,219,296
MANUAL CONTROL APPARATUS FOR STEERABLE CRAFT
Robert F. Rasmussen, Brooklyn Center, Minn., assignor to Honeywell Inc., a corporation of Delaware
Filed Jan. 18, 1965, Ser. No. 426,341
9 Claims. (Cl. 244—83)

The present invention relates to control of a device, which control may be initiated by a manual controller. Such controller may be operable about two respectively perpendicular axes with such movements developing signals or similar effects for controlling the device in two respects. If the controller is applied to an aircraft, the manual controller may be used to control the craft about two axes thereof such as the roll and pitch axes. This manual controller is thus similar to manual controllers of the prior art, such as those in Brannin et al., 3,106,371, or Mackway, 2,929,258, for example.

An object of this invention is to provide a novel manually operable side-stick controller.

A further object of this invention is to provide a manual controller having a novel mounting arrangement.

A further object of this invention is to provide a novel manual controller for high speed aircraft wherein craft control in roll is achieved by pivoting the controller about a pivot located at the base of the grip of the controller and wherein pitch control is achieved by pivoting the manual controller about a pivot which is coincident with the wrist pivot of the pilot of the craft.

A further object of this invention is to provide for adjustment of the position of one of said pivots relative to its supporting frame.

A further object of this invention is to provide for a change in the wrist-to-grip dimensions of the manual controller for physical differences in pilots.

A further object of this invention is to provide for correct balance of the manual controller for high speed aircraft during changes in such wrist-to-grip dimensions.

Figure 1:
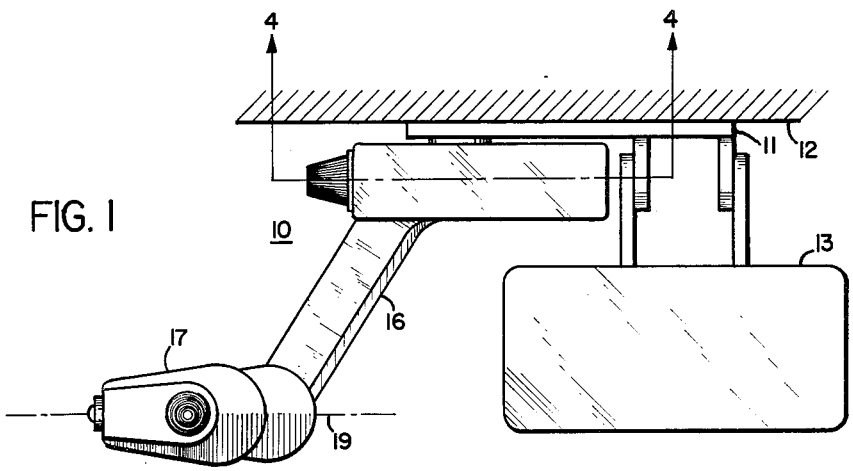
Figure 2:
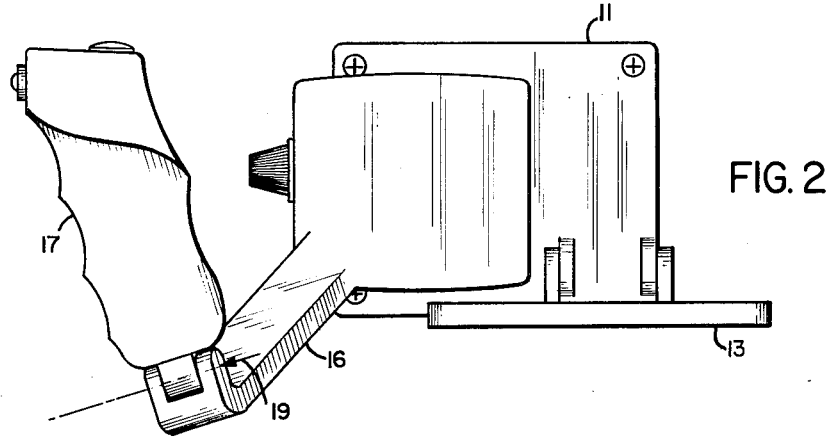
Figure 3:
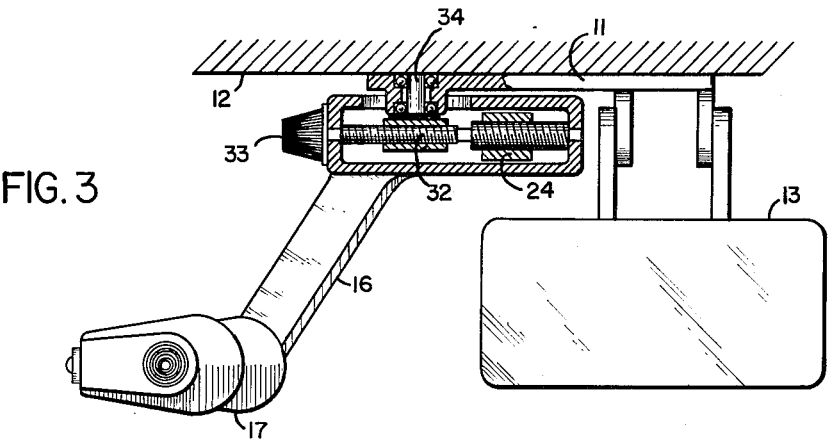
Figure 4:
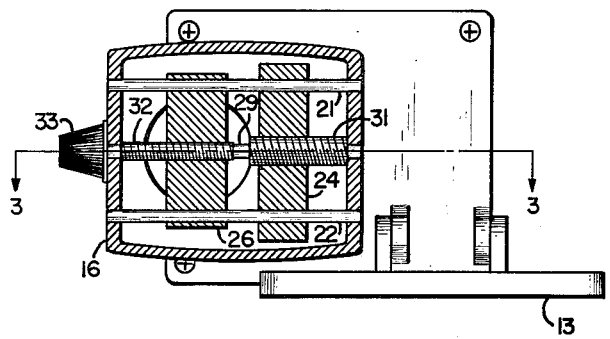

The above, and other objects of the invention will appear upon reference to the following description made in conjunction with the accompanying drawings wherein:

FIGURE 1 is a plan view of the side-stick controller;
FIGURE 2 is a side view of the novel side-stick controller;
FIGURE 3 shows a section of the mounting bracket showing the adjustable pitch pivot carrier and the adjustable counterweight; and,
FIGURE 4 is a section of FIGURE 1 showing the counterweight and pivot adjustment.

The present invention is concerned with mechanical structural features, rather than electrical structural features of a side-stick manual controller, but it is to be understood that such side-stick controller would include a displacement transducer which converts the pilot's wrist motion into electrical roll and/or pitch commands. This would be accomplished by the use of two springs centered A.C. transducers mounted within the manual side-stick body.

Roll inputs are generated by pivoting the side-stick about a pivot located at the base of the grip of the controller; and, because the amount of unbalance is relatively slight, it is unnecessary to provide a counterbalance in the roll control axis.

Pitch inputs are generated by pivoting the side-stick about a pivot which is coincident with a pilot's wrist pivot. Adjustment will be provided which will accommodate the variation in wrist-to-grip dimensions of most pilots. Since this manual controller may be utilized in high speed aircraft, and since the stick grip and its cantilever arm both cause imbalance about the pitch control axis, and, therefore, would cause forces which the pilot must overcome normally, a means of counterbalancing is provided to relieve the pilot of the required effort. In the arrangement, a single adjustment knob is used to change the wrist-to-grip dimensions. Correct balance is automatically maintained by a mechanism internal to the mounts for the cantilever arm.

Referring to FIGURE 1, a manual side-stick controller 10 consists of a mounting bracket 11 (machined from a light alloy casting, for example) which mounts directly to the aircraft structure 12 on the right side of the cockpit of the aircraft. Bracket 11 may mount a portion of the electronic circuitry such as the pitch axis transducer, exteriorly it will hold the pilot's armrest 13; pilot armrests are old, see for example, FIGURE 3 of Brannin et al., 3,106,371. Pivoting on bracket 11 at the pilot's wrist pivot, to be described, will be a cantilevered arm 16 which supports a stick grip 17 by means of the roll axis pivot 19. Arm 16 has an enlarged end to house a counterbalance and pivot mechanism.

In FIGURE 2, the handgrip 17 is shown with its pivot 19, and movement about this pivot controls roll attitude. Pivot 19 is slightly below the surface of armrest 13 so that the pivot (to be described) for cantilever arm 16 is coincident or aligned with the pilot's wrist pivot. Movement about the wrist pivot controls the aircraft pitch attitudes.

In FIGURE 3 there is schematically shown the adjustments system for the pitch pivot or pilot's wrist pivot 34 whereby each pilot may individually adjust the fore and aft or linear location of the pitch pivot so that it corresponds with his particular wrist-to-grip dimensions. The weight distribution of handgrip 17 and arm 16 about the pivot for arm 16 varies with the fore and aft position of such pivot. The pivot 34 may pass through a fore and aft slot in the rear wall of arm 16. The arrangement in FIGURE 3 includes balancing means additionally shown in FIGURE 4 so that pitch balance is automatically maintained throughout the entire range of pivot adjustment. To this end there is provided on arm 16 a first parallel shaft 21 and a second parallel shaft 22 which slidably support both a counterweight 24 and a pitch pivot carrier 26. The pitch pivot carrier 26 is mounted so as to be pivoted about a stationary axis 34. The pitch pivot carrier 26 and the counterweight 24 are centrally threaded. Parallel to the shafts 21 and 22 is a third shaft 29 having a first threaded portion 32 engaged with the threaded portion of the pivot carrier 26 and a second threaded portion 31 engaged with the threaded portion of the counterweight 24. An adjuster rotatable knob 33 is secured to one end of shaft 29 external of the cantilever arm 16. It should be noted that the portion 32 of shaft 29 has fine pitch threads whereas the portion 31 has coarse pitch threads.

It will be appreciated that without the counterbalance weight 24, there would be a weight unbalance about the pitch axis pivot 34 which would change depending upon the horizontal distance between the grip 17 and the pivot 34. By providing the counterweight 24, however, balance of arm 16 in one position at least may be obtained.

Furthermore, through adjustment of the position of counterweight 24 simultaneous with the relative adjustment of the pitch pivot carrier 26 and arm 16, continuous balance of the arm 16 about the pivot 34 is maintained. In view of the fact that to concurrently maintain balance with change in pivot position, a different moving rate of the counterweight 24 may be desired relative to the moving rate of the cantilever 16, threads of two different pitches are provided.

It will now be apparent that there has been provided a novel manual side-stick controller for controlling aircraft about two axes wherein means are included for linearly adjusting the pivot point of controller movement about one axis for pilot comfort and to remove fatigue and wherein additional provisions are included for maintaining balance in the manual controller about said pivot point during such adjustment.

What is claimed is:

1. In a manual controller for a steerable craft operable about a pivot corresponding normally to or aligned with the wrist pivot of a pilot, means for linearly adjusting the pivot position of the manual controller, and means for balancing the manual controller about said pivot despite change in position thereof.

2. The apparatus of claim 1, wherein the means for adjusting the pivot and the means for balancing the manual controller are simultaneously operated.

3. A manual controller operable about a pivot corresponding to or aligned with the wrist pivot of an operator thereof, means for linearly adjusting the position of the pivot relative to the operator, means for balancing the manual controller about said pivot despite change in the linear position thereof relative to the operator, and means for controlling the adjusting means and the balancing means whereby said balancing means is adjusted at a different rate than said adjusting means.

4. In a manual controller for a steerable craft said controller being operable about a pivot lateral to the craft, means for linearly adjusting the position of the pivot in a direction substantially perpendicular to the pivot, and means for balancing the manual controller about said pivot despite change in position thereof.

5. A manual controller for a steerable craft comprising: an armrest for receiving the forearm of an operator, a handgrip which may be grasped by the operator and operable about a first pivot by rolling action of the forearm on said support, a second member pivotally supporting said grip and movable about a second pivot at an angle to the direction of said first pivot, said second member being angularly displaced by wrist motion of the operator about the wrist pivot, means for linearly adjusting the position of one of said pivots of the manual controller relative to the operator, and means for balancing the manual controller about said pivot despite change in position of said pivot.

6. The apparatus of claim 5, with further means connected to the pivot adjusting means and the balancing means to effect simultaneous adjustment thereof.

7. In a control system, a first member, a second member, said first member being pivoted on the second member for angular displacement relative thereto, a supporting member, said second member being pivoted on the supporting member for angular movement relative thereto, said first pivot and said second pivot being relatively perpendicular to each other, means for balancing the first and second members about said second pivot, means for linearly changing the position of said second pivot in a direction at an angle to the direction of its pivot, and means for adjusting the balancing means simultaneously with a change in the position of said pivot.

8. A manual controller for a steerable craft wherein the controller is designed to command control surface position corresponding to displacements of the manual controller, a pivot for said manual controller to permit angular displacements thereof, means for adjusting the position of the pivot so that it corresponds to the wrist pivot of an operator of the controller, means for balancing the manual controller about said pivot, and means for jointly adjusting the position of the pivot and operating said balancing means.

9. In an aircraft having control surfaces and a sidestick designed to command control surface position corresponding to angular displacement of the side-stick, said side-stick comprising: an armrest for said side-stick controller, a stick grip having a pivot located at the base of the grip, said grip having a pivot located at the base of the grip, said grip being angularly displaced relative to the longitudinal axis of the craft, a cantilevered arm which pivotally supports said grip and in turn is pivotable about a second axis having a direction corresponding to the lateral axis of the craft, and means for balancing the grip and cantilevered arm about the lateral axis, and means for adjusting the position of the lateral pivot while maintaining balance of the grip and arm about said pivot.

No references cited.

MILTON BUCHLER, *Primary Examiner.*